US010346818B2

(12) United States Patent
Yokota et al.

(10) Patent No.: US 10,346,818 B2
(45) Date of Patent: Jul. 9, 2019

(54) CONTENT PROVISION SYSTEM, CONTENT PROVISION METHOD, CONTENT SERVER, AND NON-TRANSITORY COMPUTER-READABLE STORAGE MEDIUM STORING CONTENT PROVISION PROGRAM

(71) Applicant: NINTENDO CO., LTD., Kyoto (JP)

(72) Inventors: Genki Yokota, Kyoto (JP); Kouhei Maeda, Kyoto (JP)

(73) Assignee: Nintendo Co., Ltd., Kyoto (JP)

( * ) Notice: Subject to any disclaimer, the term of this patent is extended or adjusted under 35 U.S.C. 154(b) by 428 days.

(21) Appl. No.: 14/934,411

(22) Filed: Nov. 6, 2015

(65) Prior Publication Data

US 2016/0294883 A1 Oct. 6, 2016

(30) Foreign Application Priority Data

Mar. 30, 2015 (JP) .................. 2015-070090

(51) Int. Cl.
*A63F 13/00* (2014.01)
*A63F 13/77* (2014.01)
(Continued)

(52) U.S. Cl.
CPC ............. *G06Q 20/14* (2013.01); *A63F 13/00* (2013.01); *A63F 13/352* (2014.09); *A63F 13/77* (2014.09); *A63F 13/792* (2014.09); *G06Q 20/123* (2013.01); *G06Q 20/145* (2013.01); *G06Q 20/29* (2013.01); *H04L 67/10* (2013.01); *H04L 67/12* (2013.01)

(58) Field of Classification Search
CPC ......... G06Q 20/14; A63F 13/00; A63F 13/77; A63F 13/352; A63F 13/792; H04L 67/10; H04L 67/12
See application file for complete search history.

(56) References Cited

U.S. PATENT DOCUMENTS 6,475,083 B1 * 11/2002 Gomez .................. A63F 13/06
463/1
2001/0034705 A1 * 10/2001 Rhoads .................. G06Q 20/10
705/39

(Continued)

FOREIGN PATENT DOCUMENTS

JP 2007-135791 6/2007

*Primary Examiner* — Azizul Choudhury
(74) *Attorney, Agent, or Firm* — Nixon & Vanderhye, P.C.

(57) ABSTRACT

A content provision system includes a content server and a terminal, and a plurality of pieces of additional content including first and second content used in an application are provided from the content server to the terminal. The terminal transmits acquisition completion information to the content server when any one of the first content and the second content is acquired, and transmits acquisition incompletion information to the content server when none of the first content and the second content is acquired. The content server performs a billing process and provides additional content designated from the terminal to the terminal when the acquisition completion information is received, and provides one of the first and second content designated from the terminal to the terminal without performing the billing process when the acquisition incompletion information is received.

22 Claims, 7 Drawing Sheets

(51) Int. Cl.
*G06Q 20/12* (2012.01)
*G06Q 20/14* (2012.01)
*G06Q 20/22* (2012.01)
*H04L 29/08* (2006.01)
*A63F 13/352* (2014.01)
*A63F 13/792* (2014.01)

(56) References Cited

U.S. PATENT DOCUMENTS

| | | | |
|---|---|---|---|
| 2003/0041123 A1* | 2/2003 | Sato | G06Q 20/04 709/219 |
| 2003/0232616 A1* | 12/2003 | Gidron | G06Q 30/04 455/406 |
| 2004/0068570 A1* | 4/2004 | Haller | G06O 20/201 709/228 |
| 2007/0111802 A1 | 5/2007 | Ishihara et al. | |
| 2013/0116044 A1* | 5/2013 | Schwartz | A63F 13/12 463/29 |
| 2013/0138521 A1* | 5/2013 | Want | G06Q 20/32 705/26.1 |
| 2014/0358662 A1* | 12/2014 | De Luca | G06Q 30/0226 705/14.27 |
| 2015/0100476 A1* | 4/2015 | Agapitov | G06Q 20/123 705/39 |

* cited by examiner

CONTENT PROVISION SYSTEM, CONTENT PROVISION METHOD, CONTENT SERVER, AND NON-TRANSITORY COMPUTER-READABLE STORAGE MEDIUM STORING CONTENT PROVISION PROGRAM

CROSS REFERENCE TO RELATED APPLICATION

This application claims the benefit of Japanese Priority Patent Application No. 2015-070090 filed on Mar. 30, 2015, the entire contents of which are incorporated herein by reference.

FIELD

The technology herein relates to a content provision system, a content provision method, a content server, and a non-transitory computer-readable storage medium that stores a content provision program, which provide a terminal with a plurality of types of content used in an application.

BACKGROUND AND SUMMARY

In the past, a plurality of types of game applications of different versions on a game having the same theme have been provided from a game software maker. The user can purchase and use each of a plurality of types of game applications of different versions. For example, in a simulation role playing game (SRPG) having both an element of a role playing game and an element of a simulation game, there are cases in which a plurality of versions that are the same in a basic setting of a story and main characters but differ in a scenario, a map, or a level of difficulty are provided.

However, in the past, when it is desired to play a plurality of types of games of different versions, it is necessary to purchase each application individually. It is an object of the technology to provide a technique useful when a plurality of types of applications of different versions are provided.

A content provision system of a first aspect includes: a content server; and a terminal, the system providing a plurality of pieces of additional content used in an application from the content server to the terminal. The terminal includes at least one processor, the at least one processor being configured to receive designation of the additional content, transmit an acquisition request for requesting acquisition of the designated additional content to the content server, the at least one processor being further configured to transmit acquisition completion information to the content server when a predetermined number or more of pieces of additional content are acquired, and the at least one processor being further configured to transmit acquisition incompletion information to the content server when the number of acquired additional content is less than the predetermined number. The content server includes at least one processor, the at least one processor of the content server being configured to receive the acquisition request and the acquisition completion information or the acquisition incompletion information, the at least one processor of the contents server being further configured to perform a billing process and provide the additional content requested through the acquisition request to the terminal when the acquisition completion information is received, and provide the additional content requested through the acquisition request to the terminal without performing the billing process when the acquisition incompletion information is received.

According to this configuration, it is possible to sell an application without additional content, and after purchasing such an application, typically, the user can use an application using another content (basic content) without using additional content and thereafter acquire additional content using the content provision system having the above configuration. In this case, a fee for a predetermined number of additional content among a plurality of pieces of additional content may be included in a fee for an application. In other words, a sales style in which a fee is paid before a predetermined number of addition content among a plurality of pieces of additional content is acquired from the content server is possible. In this sales style, additional content desired to be initially acquired by the user may be set to be distinguished from additional content desired to be acquired after at least a predetermined number of additional content is acquired. In other words, since a predetermined number of additional content can be acquired from the content server without performing the billing process, it is possible to encourage the user to acquire such additional content first.

For example, by setting such that the above "a plurality of pieces of additional content" are "a plurality of pieces of additional content including first content and second content," and the above "predetermined number" is "1," the content provision system is applied as a content provision system including a content server and a terminal, wherein additional content including first and second content used in an application is provided from the content server to the terminal, the terminal includes at least one processor, the at least one processor being configured to receive designation of the additional content to be acquired, the at least one processor being further configured to transmit an acquisition request for requesting acquisition of the designate additional content to the content server, the at least one processor being further configured to transmit acquisition completion information to the content server when any one of the first content and the second content is acquired and transmit acquisition incompletion information to the content server when none of the first content and the second content is acquired, and the content server includes at least one processor, the at least one processor of the content server being configured to receive the acquisition request and either of the acquisition completion information and the acquisition incompletion information, the at least one processor of the content server being further configured to perform a billing process and provide the additional content requested through the acquisition request to the terminal when the acquisition completion information is received, and provide the additional content requested through the acquisition request to the terminal without performing the billing process when the acquisition incompletion information is received.

In a content provision system of a second aspect, in the content provision system of the first aspect, the application undergoes the billing process and is downloaded to the terminal.

According to this configuration, since the application is provided for a fee, a fee for a predetermined number of additional content that can be acquired without performing the billing process may be included in a fee for the application in advance.

In a content provision system of a third aspect, in the content provision system of the second aspect, the terminal designates the additional content after the billing process for the application, transmits the acquisition request according to the designation to the content server, and transmits the acquisition incompletion information to the content server.

According to this configuration, additional content acquired after a bill for the application is given can be provided for free.

In a content provision system of a fourth aspect, in the content provision system of any one of the first to third aspects, the content provision system further includes at least one processor, the at least one processor being configured to encourage the terminal to acquire the additional content that has not been acquired by the terminal among the additional content.

According to this configuration, it is possible to guide new acquisition of non-acquired additional content according to an acquisition status of additional content.

In a content provision system of a fifth aspect, in the content provision system of the fourth aspect, the plurality of pieces of additional content include a plurality of pieces of specific additional content, and the at least one processor being further configured to limit acquisition of additional content other than the specific additional content when the number of acquired specific additional content is less than the predetermined number.

According to this configuration, it is possible to cause the user to acquire a predetermined number of specific additional content first.

In a content provision system of a sixth aspect, in the content provision system of any one of the first to fifth aspects, the application is an application including basic content, and the terminal is accessible to the content server in order to acquire the additional content when a predetermined condition is satisfied in execution of the basic content.

According to this configuration, it is possible to confer continuity or relevance between execution of an application based on basic content and execution of an application based on additional content. For example, when a condition in which basic content is executed up to the end is satisfied, additional content can be provided as content to be continued.

In a content provision system of a seventh aspect, in the content provision system of any one of the first to fifth aspects, the terminal is accessible to the content server in order to acquire the additional content when the application is not executed.

According to this configuration, even when a game is not being executed, it is possible to acquire additional content at a timing desired by the user.

In a content provision system of an eighth aspect, in the content provision system of any one of the first to seventh aspects, the application is an application of a game, and the plurality of pieces of additional content differ in a scenario, a map, a level of difficulty, and/or characters to be a colleague in the game.

According to this configuration, it is possible to provide a plurality of versions of games that differ in a scenario, a map, a level of difficulty, and/or characters to be a colleague in the game.

A content provision system of a ninth aspect is a content provision system including a content server and a terminal, wherein additional content including first and second content used in an application is provided from the content server to the terminal. The terminal includes at least one processor, the at least one processor being configured to transmit first acquisition completion information to the content server when a first application including basic content and the first content is acquired and transmit second acquisition completion information to the content server when a second application including the basic content and the second content is acquired, the at least one processor being further configured to designate one of the first content and the second content that has not been acquired, and the at least one processor being further configured to transmit an acquisition request for requesting the designated content. The content server includes at least one processor, the at least one processor of the content server being configured to receive the acquisition request and either of the first acquisition completion information and the second acquisition completion information, the at least one processor of the contents server being configured to perform a billing process and provide the second content to the terminal when the first acquisition completion information is received, and perform the billing process and provide the first content to the terminal when the second acquisition completion information is received through a receiving unit.

According to this configuration, for the user who has purchased any one of two types of applications with different additional content, it is possible to perform the billing process and provide additional content included in an application that has not been purchased.

In a content provision system of a tenth aspect, in the content provision system of the ninth aspect, the content provision system includes at least one processor, the at least one processor being configured to encourage acquisition of the second content when the first application has been acquired and encourage acquisition of the first content when the second application has been acquired.

According to the above configuration, the content server encourages acquisition of the second content when the first application is acquired and encourages acquisition of the first content when the second application is acquired. Thus, the user can acquire additional content that has not been acquired by him/her by using the content provision system.

In a content provision system of an eleventh aspect, in the content provision system of the ninth or tenth aspect, the terminal is accessible to the content server in order to acquire the non-acquired additional content when a predetermined condition is satisfied in execution of the basic content.

According to this configuration, it is possible to confer continuity or relevance between execution of an application based on basic content and execution of an application based on additional content. For example, when a condition in which basic content is executed up to the end is satisfied, additional content can be provided as content to be continued.

In a content provision system of a twelfth aspect, in the content provision system of any one of the ninth to eleventh aspects, the terminal is accessible to the content server in order to acquire the non-acquired additional content when the application is not executed.

According to this configuration, even when the application is not being executed, it is possible to acquire additional content at a timing desired by the user.

In a content provision system of a thirteenth aspect, in the content provision system of any one of the ninth to twelfth aspects, the application is an application of a game, and the plurality of pieces of additional content differ in a scenario, a map, a level of difficulty, and/or characters to be colleague in the game.

According to this configuration, it is possible to provide a plurality of versions of games that differ in a scenario, a map, a level of difficulty, and/or characters that become to be a colleague in the game.

A content provision method of a fourteenth aspect is a content provision method of providing a plurality of pieces of additional content used in an application from a content server to a terminal, and includes designating, by the terminal, additional content to be acquired, transmitting, by the terminal, an acquisition request according to the designation to the content server, transmitting, by the terminal, acquisition completion information to the content server when a predetermined number or more of pieces of additional content are acquired, transmitting, by the terminal, acquisition incompletion information to the content server when the number of acquired additional content is less than the predetermined number, receiving, by the content server, the acquisition request, receiving, by the content server, the acquisition completion information or the acquisition incompletion information, performing, by the content server, a billing process and providing the additional content requested through the acquisition request to the terminal when the acquisition completion information is received, and providing, by the content server, the additional content requested through the acquisition request to the terminal without performing the billing process when the acquisition incompletion information is received.

According to this configuration, it is possible to sell an application without additional content, and after purchasing such an application, typically, the user can use an application using another content (basic content) without using additional content and thereafter acquire additional content using the content provision method having the above configuration.

A content provision method of a fifteenth aspect is a content provision method of providing additional content including first and second content used in an application from a content server to a terminal, and includes transmitting, by the terminal, first acquisition completion information to the content server when a first application including basic content and the first content are acquired, transmitting, by the terminal, second acquisition completion information to the content server when a second application including the basic content and the second content is acquired, designating, by the terminal, one of the first content and the second content that has not been acquired, transmitting, by the terminal, an acquisition request for requesting the designated content, receiving, by the content server, the acquisition status information, receiving, by the content server, the acquisition request, performing, by the content server, a billing process and providing the second content to the terminal when the first acquisition completion information is received, and performing, by the content server, the billing process and providing the first content to the terminal when the second acquisition completion information is received.

According to this configuration, for the user who has purchased an application with additional content, it is possible to perform the billing process and provide new additional content.

A content server of a sixteen the aspect is a content server that provides a plurality of pieces of additional content used in an application to a terminal, and includes at least one processor, the at least one processor being configured to receive acquisition completion information indicating that a predetermined number or more of additional content is acquired or acquisition incompletion information indicating that the number of acquired additional content is less than the predetermined number and receive an acquisition request for requesting acquisition of the designated additional content, the at least one processor being further configured to perform a billing process and provide the additional content requested through the acquisition request to the terminal when the acquisition completion information is received, and provide the additional content requested through the acquisition request to the terminal without performing the billing process when the acquisition incompletion information is received.

According to this configuration, it is possible to sell an application without additional content, and after purchasing such an application, typically, the user can use an application using another content (basic content) without using additional content and thereafter acquire additional content using the content provision server having the above configuration.

A content server of a seventeenth aspect is a content server that provides a plurality of pieces of additional content including first and second content used in an application to a terminal, and includes at least one processor, the at least one processor being configured to receive first acquisition completion information when a first application including basic content and the first content transmitted from the terminal is acquired or second acquisition completion information when a second application including the basic content and the second content is acquired, receive an acquisition request for requesting acquisition of the designated additional content, the at least one processor being further configured to perform a billing process and provide the second content to the terminal when the first acquisition completion information is received, and perform the billing process and provide the first content to the terminal when the second acquisition completion information is received.

According to this configuration, for the user who has purchased an application with additional content, it is possible to perform the billing process and provide new additional content.

An eighteenth aspect is a non-transitory computer-readable storage medium that stores a content provision program, and the content provision program is executed by a computer and causes the computer to function as the content server of the sixteenth aspect.

A nineteenth aspect is a non-transitory computer-readable storage medium that stores a content provision program, and the content provision program is executed by a computer and causes the computer to function as the content server of the seventeenth aspect.

DETAILED DESCRIPTION OF NON-LIMITING EXAMPLE EMBODIMENTS

Hereinafter, an exemplary embodiment will be described with reference to the appended drawings. The following embodiment is an example for carrying out the technology and not intended to limit the technology to a specific configuration described below. In carrying out the technology, a specific configuration according to an embodiment may be approximately employed.

Figure 1:
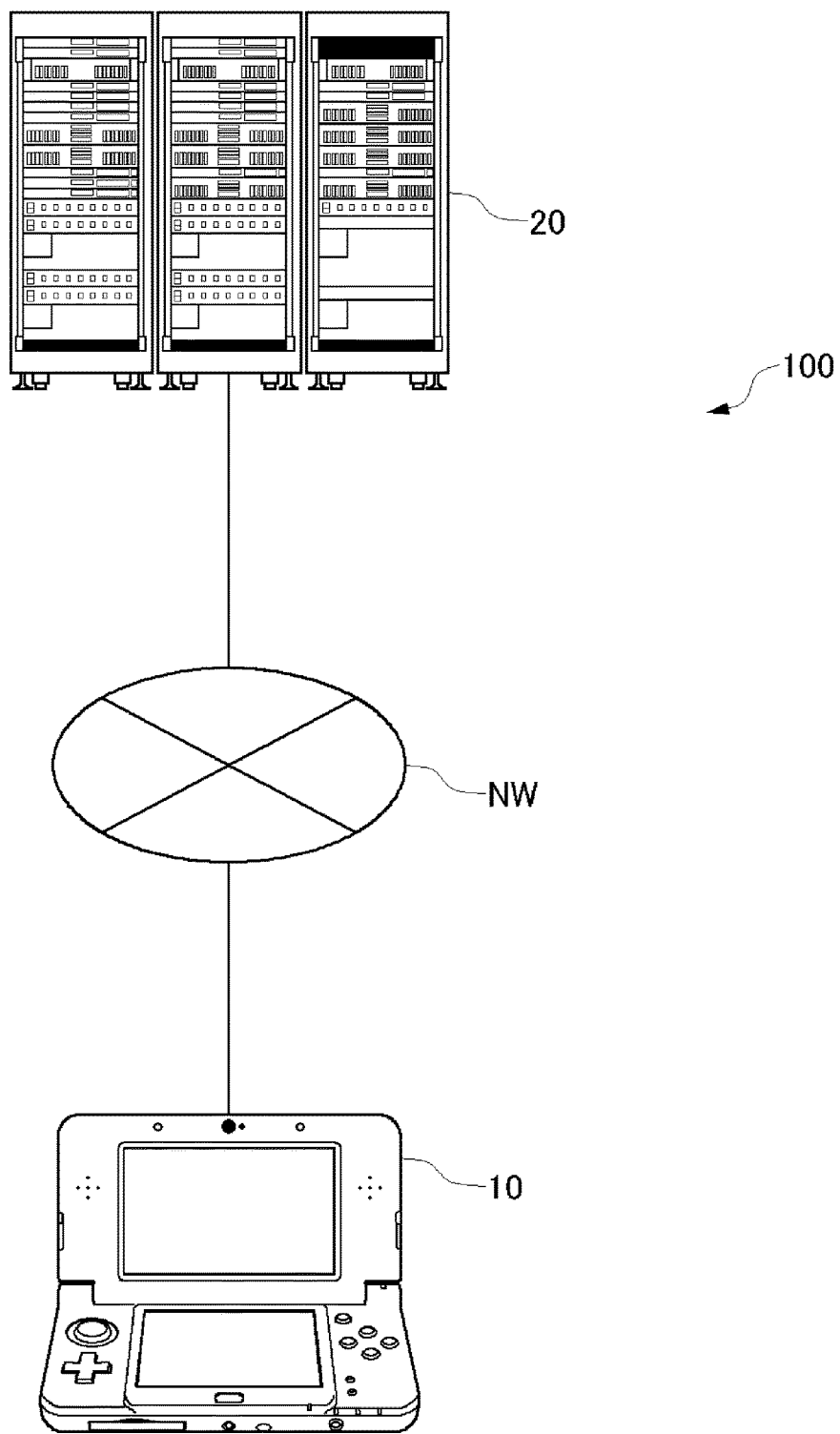
FIG. 1 schematically shows an example non-limiting configuration of a content provision system.

FIG. 1 schematically shows an example non-limiting configuration of a content provision system. A content provision system 100 is configured to include a terminal 10 and a content server 20. The terminal 10 and the content server 20 are connected to a communication network NW, so that information communication can be performed therebetween. To this end, the terminal 10 and the content server 20 are further equipped with a communication device including a transmitting device and a receiving device.

The content server 20 is constantly connected to the communication network NW. The terminal 10 is connected to the communication network NW constantly or by an operation of the user and capable of performing transmission and reception of various kinds of digital data with the server 20. All communication paths for enabling communication between the server 20 and the terminal 10 may be a wireless path or a wired path, some communication paths may be a wireless path, and some communication paths may be a wired path.

Both of the terminal 10 and the server 20 are a computer equipped with a processor, a memory, an auxiliary memory device, and the like and operate according to a program. The terminal 10 is further equipped with an input device that receives an input from the user and an output device that outputs information in the form of a video, a sound, a vibration, or the like. The terminal 10 is typically configured as a stationary or portable game machine, and in this case, the input device may include a stick, a button, an acceleration sensor, a touch pad, or a microphone, and the output device may include a display, a speaker, or a vibration mechanism.

Figure 2:
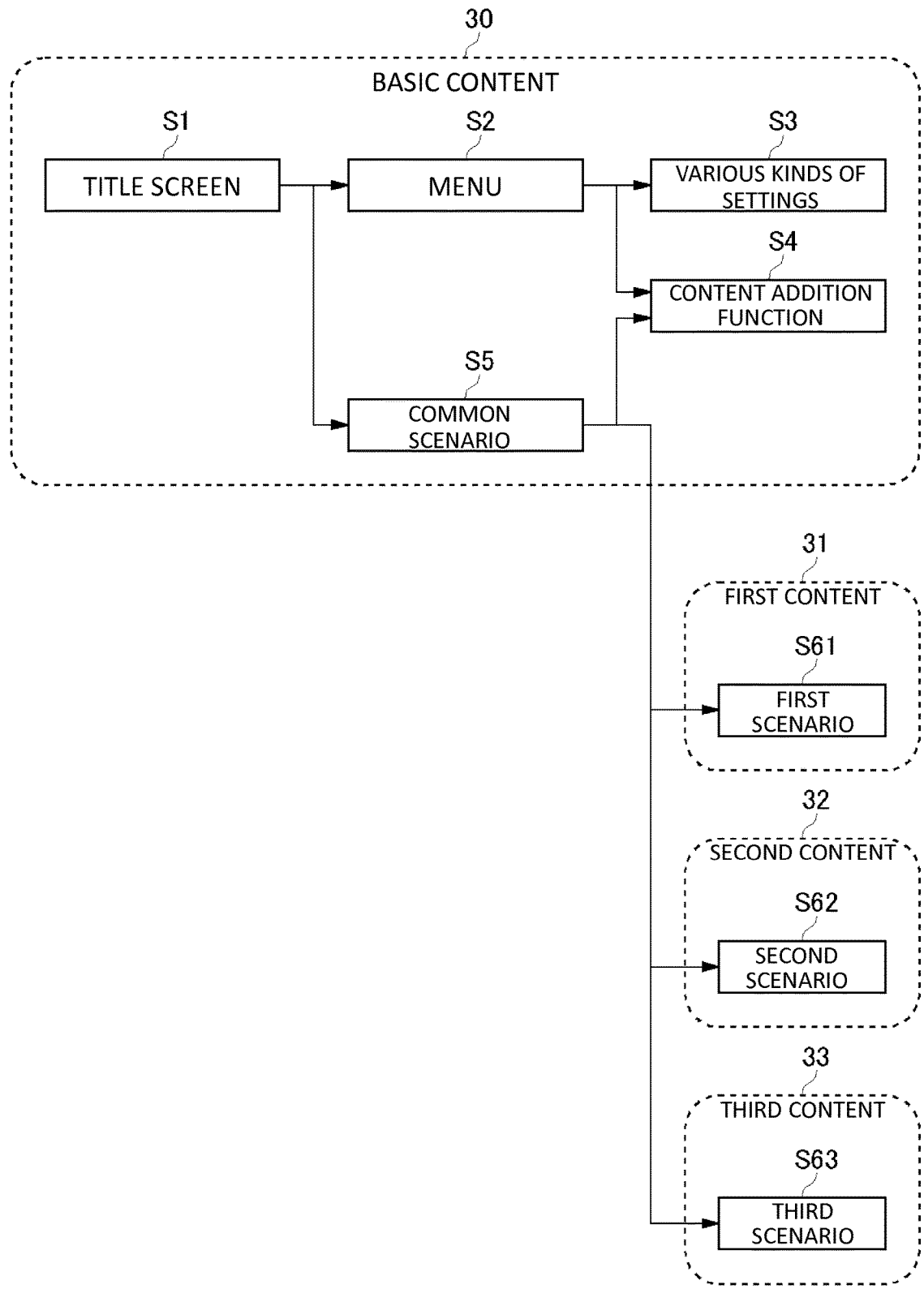
FIG. 2 shows an example non-limiting application and substance of content.

FIG. 2 shows an example non-limiting application and substance of content. An application is executed using content. As content, basic content 30 and additional content 31 to 33 are prepared. As the additional content, first additional content (hereinafter, referred to as "first content") 31, second additional content (hereinafter, referred to as "second content") 32, and third additional content (hereinafter, referred to as "third content") 33 are prepared.

In the present embodiment, the application is an application of SRPG. Each piece of additional content is content having a different scenario in the SRPG. This is an example and the application is not limited to an application of the SRPG and not limited to a game application. Further, content to be provided is not limited to content of a scenario of SRPG, not limited to content of SRPG, and not limited to a game content.

When the application is activated, a title screen S1 is displayed on the display of the terminal 10. The application executes a menu S2 and a common scenario S5 of a game using the basic content 30. The menu S2 includes a function (content addition function) S4 of acquiring additional content in addition to various kinds of settings S3 for the game.

The user can give an instruction for starting the menu or the game on the title screen S1. When the user gives an instruction for starting the game using the input device, the game starts from the common scenario S5. When the user gives an instruction for the menu using the input device, the menu S2 starts. When the user selects content addition in the menu S2 using the input device, the content addition function S4 starts. When the user selects various kinds of settings in the menu using the input device, the various kinds of settings S3 starts.

The game employs a "chapter" as the progress of the scenario, and as the scenario moves forward, a chapter number increases. In the present embodiment, the common scenario S5 includes a first chapter to a sixth chapter. When the common scenario S5 ends (the sixth chapter ends), any one of the first scenario S61, the second scenario S62, and the third scenario S63 moves forward next according to selection of the user. In other words, a point in time at which the common scenario S5 ends serves as a branch point to the first scenario S61, the second scenario S62, and the third scenario S63.

The first scenario S61, the second scenario S62, and the third scenario S63 are executed using the first content 31, the second content 32, and the third content 33, respectively. The first scenario S61, the second scenario S62, and the third scenario S63 differ in a map, a level of difficulty, and characters to be a colleague. In other words, the first content 31, the second content 32, and the third content 33 differ in a scenario, a map, a level of difficulty, and characters to be a colleague.

The SRPG of the present embodiment is under the theme of a war between counties. The first scenario S61 is a main (royal road) scenario in which a righteous side is lead to victory in a war. A level of difficulty of the first scenario S61 is set to a medium level. The second scenario S62 is an agonizing scenario in which it stands by an evil side, and the country is reformed from the inside. A level of difficulty of the second scenario S62 is set to a high level. The third scenario S63 is a scenario in which it stands by neither the righteous side or the evil side, and a war is performed, and most characters are go in cahoots with one another. The third scenario S63 has a story that is difficult to be understood unless the first scenario S61 or the second scenario S62 is played and is suitably played after the first scenario S61 or the second scenario S62 is played. All of the first scenario S61, the second scenario S62, and the third scenario S63 have the substance in which a story is completed independently.

When the common scenario S5 ends, the application proceeds to any one of the first scenario S61, the second scenario S62, and the third scenario S63, and causes a scenario selection screen to be displayed on the display for selection of the user. On the scenario selection screen, a scenario corresponding to additional content that has been already acquired is selectable, but a scenario corresponding to non-acquired additional content is displayed in a grayed-out manner and non-selectable. When the user selects the grayed-out scenario corresponding to the non-acquired additional content on the scenario selection screen using the input device of the terminal 10, the application starts the content addition function S4.

Figure 3A:
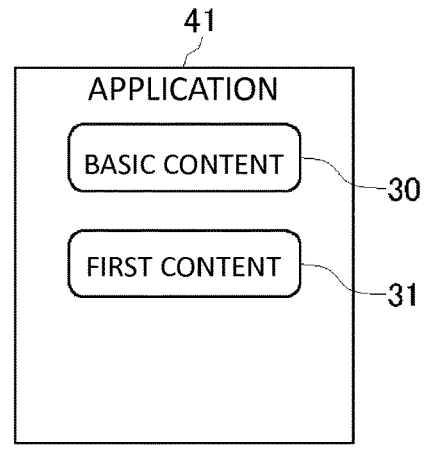
FIG. 3A shows an example non-limiting application including first content.
Figure 3B:
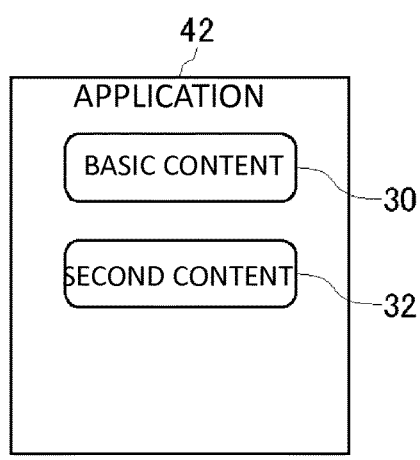
FIG. 3B shows an example non-limiting application including second content.
Figure 3C:
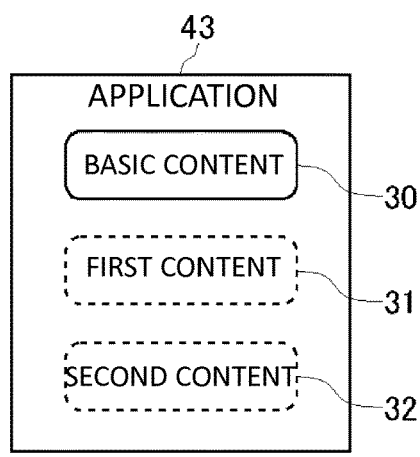
FIG. 3C shows an example non-limiting application including neither first content nor second content.

FIG. 3A to FIG. 3C show an example non-limiting application sales style. The application is sold with the basic content 30 included therein. For additional scenarios 31 to 33, there are one including the first content 31 as shown in FIG. 3A, one including the second content 32 as shown in FIG. 3B, and one including neither the first content 31 nor the second content 32 as shown in FIG. 3C.

The user can purchase an application 41 including the basic content 30 and the first content 31 as shown in FIG. 3A, an application 42 including the basic content 30 and the second content 32 as shown in FIG. 3B, or an application 43 including the basic content 30 but including neither the first content 31 nor the second content 32 as shown in FIG. 3C. The user recognizes that the applications 41 to 43 are a plurality of types of applications of different versions for the same theme, selects any one version, and purchases an application. A fee for each of the applications 41 and 42 with the additional content shown in FIGS. 3A and 3B is the same as a fee for the application 43 without additional content shown in FIG. 3C.

The applications 41 to 43 are provided to the user through package selling in which an application is recorded in a recording medium called a cartridge or download selling in which an application is downloaded to the terminal 10 via a communication network. In the present embodiment, the applications 41 and 42 including the first content 31 and the second content 32 serving as the additional content as illustrated in FIGS. 3A and 3B, respectively are sold through the package selling, and the application 43 including no additional content as illustrated in FIG. 3C is sold through the download selling.

However, this is an example, and the applications 41 and 42 including the additional content may be sold through the download selling, and the application 43 including no additional content may be recorded in a recording medium and sold. Further, an application with additional content in which two of the first content 31, the second content 32, and the third content 33 are included may be sold, and an application with additional content in which all of three pieces of additional content are added may be sold. In any case, when the applications 41 and 42 are sold through the package selling or the download selling, selling or billing is performed on a purchaser, and particularly, in the case of the download selling, an electronic billing process is performed.

Acquisition of the additional content 31 to 33 after the applications 41 and 42 with the additional content or the application 43 without additional content is purchased will be described. The user who has purchased the application 43 without additional content can play only the common scenario S5 unless the additional content is added (see FIG. 2). Thus, in order to continue the game after the common scenario S5 ends, it is necessary to acquire the additional content.

The user starts the content addition function S4 from the menu S2 and accesses the content server 20 in order to acquire the additional content. As described above, when the common scenario S5 ends, the application displays the scenario selection screen used to select any one of the first scenario S61, the second scenario S62, and the third scenario S63.

Figure 4:
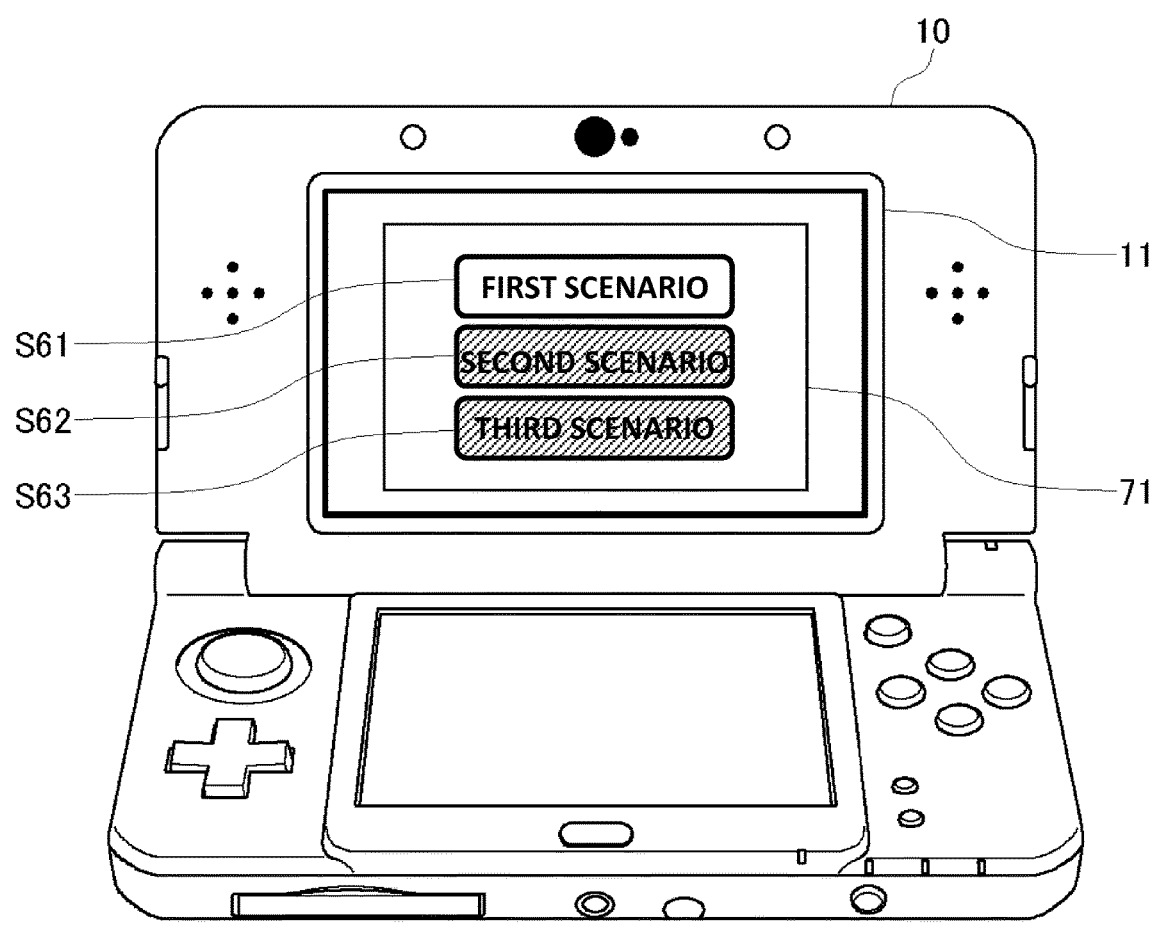
FIG. 4 shows an example non-limiting terminal that displays a scenario selection screen.

FIG. 4 is a diagram illustrating the terminal 10 that displays the scenario selection screen. A scenario selection screen 71 is displayed on a display 11 of the terminal 10. On the scenario selection screen 71, a scenario in which the user has not acquired the additional content is displayed in the grayed-out manner. In the example of FIG. 4, since the second content and the third content have not been acquired yet, the second scenario S62 and the third scenario S63 corresponding to the second content and the third content are displayed in the grayed-out manner. When the user selects the grayed-out scenario on the scenario selection screen 71, the application starts the content addition function S4 in order to acquire additional content corresponding to the selected scenario.

When the content addition function S4 is started, the terminal 10 causes an acquisition guide screen to be displayed on the display. When additional content desired to be acquired is designated according to the acquisition guide screen in the terminal 10, an acquisition request for requesting downloading of the designated additional content is transmitted from the transmitting device of the terminal 10 to the content server 20. The content server 20 receives the acquisition request through the receiving device thereof. The content server 20 transmits additional content to the terminal 10 in response to the received acquisition request.

The terminal 10 transmits information (acquisition status information) indicating an acquisition status of the additional content in addition to the acquisition request for acquiring the additional content to the content server 20. The content server 20 receives the acquisition status information through the receiving device, and determines whether or not the billing process is performed according to the acquisition status information. This will be described below in detail.

Figure 5:
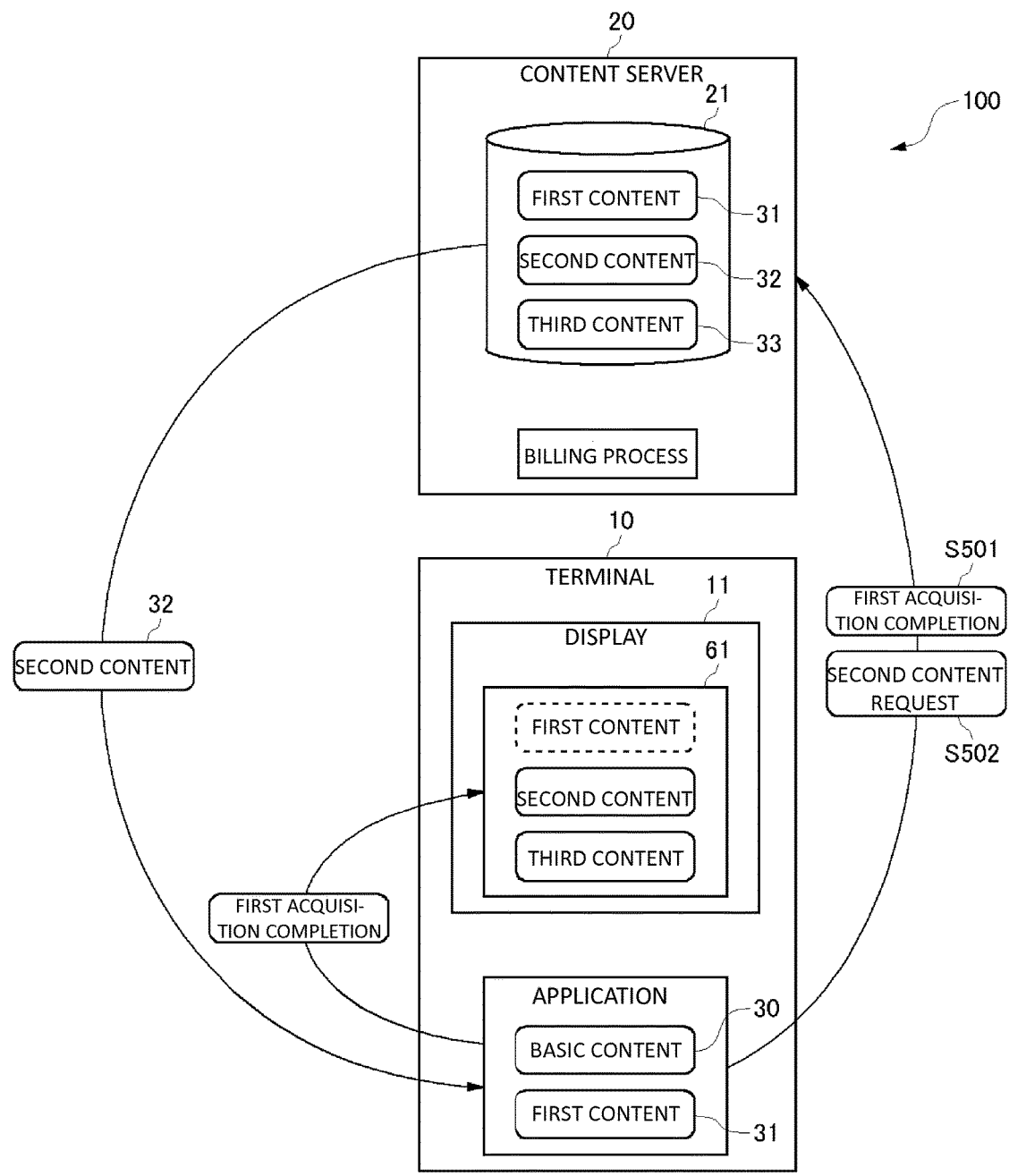
FIG. 5 shows an example non-limiting acquisition of additional content by a user who has purchased an application including first content.

FIG. 5 is a diagram for describing acquisition of additional content by the user that has purchased the application 41 including the first content 31 illustrated in FIG. 3A.

Typically, after the game of the first scenario S61 based on the first content 31 ends, the user makes an attempt to acquire other additional content 32 and 33. In this case, after the playing of the first scenario S61 ends, the content addition function S4 can start from the menu S2 (see FIG. 2).

However, as described above, when the common scenario S5 ends, the scenario selection screen causing the user to select any one of the first scenario S61, the second scenario S62, and the third scenario S63 to proceed is displayed on the display 11, but the user who has purchased the application 41 including the first content 31 may desire to proceed to the second scenario S62 or the third scenario S63 before playing the first scenario S61 using the acquired first content 31. In this case, as described above, when the user selects the second scenario S62 or the third scenario S63 which is grayed-out on the scenario selection screen 71, the application starts the content addition function S4.

When the content addition function S4 is started, the terminal 10 causes a first acquisition guide screen 61 to be displayed on the display 11. The user selects desired additional content according to the first acquisition guide screen 61 displayed on the display 11, and the terminal 10 accordingly transmits the acquisition request for requesting downloading of the designated additional content to the content server 20 using the transmitting device.

The acquisition status of the additional content is reflected on the first acquisition guide screen 61. In the example of FIG. 5, since the first content 31 has already been acquired, only the second content 32 and the third content 33 are selectable on the first acquisition guide screen 61, and the first content 31 is displayed in the grayed-out manner and not selectable, and acquisition of the second content 32 and the third content 33 is encouraged. In the terminal 10, the acquisition guide screen according to the acquisition status of the additional content is prepared in advance and held, and thus the corresponding acquisition guide screen may be read and displayed on the display according to the acquisition status, and the acquisition guide screen may be generated and displayed on the display according to the acquisition status each time. The acquisition guide screen or the configuration of storing, reading or generating, and displaying the acquisition guide screen corresponds to an acquisition guide unit according to the present invention.

As a technique of encouraging the acquisition of the second content and the third content through the first acquisition guide screen 61, instead of the above example, the first content 31 may not be displayed, and after the first content 31 is set to be selectable, a message indicating that the first content 31 has already been acquired, and it is unnecessary to acquire the first content 31 may be displayed within the first acquisition guide screen 61, or the message may be presented in a pop-up manner when the first content 31 is selected.

In the terminal 10, the acquisition status of the additional content is recorded, and the record is updated when additional content is added. The acquisition status of the additional content can be understood with reference to the record. Specifically, a flag may be prepared for each of the first to third content 31 to 33, and the acquisition status of the additional content may be recorded by setting the flag to acquired additional content.

When the user selects and designates a desired one of the second content 32 and the third content 33 according to the first acquisition guide screen 61 displayed on the display 11, the terminal 10 transmits an acquisition request S502 for requesting acquisition (downloading) of the designated additional content to the content server 20 using the transmitting device. FIG. 5 illustrates the example in which the acquisition of the second content 32 is requested through the acquisition request S502, and the content server 20 transmits the second content 32 to the terminal 10, but when acquisition of the third content 33 is requested through the acquisition request S502, the content server 20 transmits the third content 33 to the terminal 10 according to the acquisition request S502.

The terminal 10 transmits the acquisition status information to the content server 20 using the transmitting device. In the example of FIG. 5, since the first content 31 has already been acquired, the terminal 10 transmits first acquisition completion information S501 indicating that the first content 31 has been acquired to the content server 20 as the acquisition status information. The acquisition completion information S501 may be transmitted before the acquisition request S502, transmitted at the same time as the acquisition request S502, or transmitted after the acquisition request S502.

An auxiliary memory device 21 of the content server 20 stores the first content 31, the second content 32, and the third content 33. Upon receiving the acquisition request S502 and the acquisition completion information S501, the content server 20 transmits the additional content requested through the acquisition request S502 to the terminal 10 using the transmitting device. At this time, it is determined whether or not the billing process is performed based on the acquisition status information. In the example of FIG. 5, acquisition of the second content 32 or the third content is requested through the acquisition request, but when the first content 31 is determined to have already been acquired based on the first acquisition status information, the content server 20 performs the billing process for the second content 32 or the third content that has been requested.

The terminal 10 receives the additional content transmitted from the content server 20 and stores the received additional content in the auxiliary memory device of the terminal 10. Further, when the application is purchased through the package selling, and the application is recorded in the recording medium, the additional content acquired (downloaded) from the content server 20 may be stored in the recording medium rather than the terminal 10.

A process of paying a fee for the requested additional content is performed by an external payment server (not shown) in some cases, but in this case, the content server 20 performs a process of requesting the payment server to perform the payment process as the billing process. As a payment method, an arbitrary method of a related art, for example, a method using a credit card or a prepaid card may be employed. After checking that the payment has been completed, the content server 20 transmits the additional content requested through the acquisition request to the terminal 10.

In the above embodiment, the first acquisition guide screen 61 causes the user to select the second content 32 and the third content 33, but the first acquisition guide screen 61 may cause the user to select the second scenario S62 and the third scenario S63 instead. In any cases, the second content 32 or the third content 33 is actually downloaded, but in order to facilitate understanding of the user, the second scenario S62 or the third scenario S63 rather than the second content 32 and the third content 33 may be presented on the first acquisition guide screen 61 as a selection candidate. The same applies to examples of FIGS. 6 and 7 described below.

Figure 6:
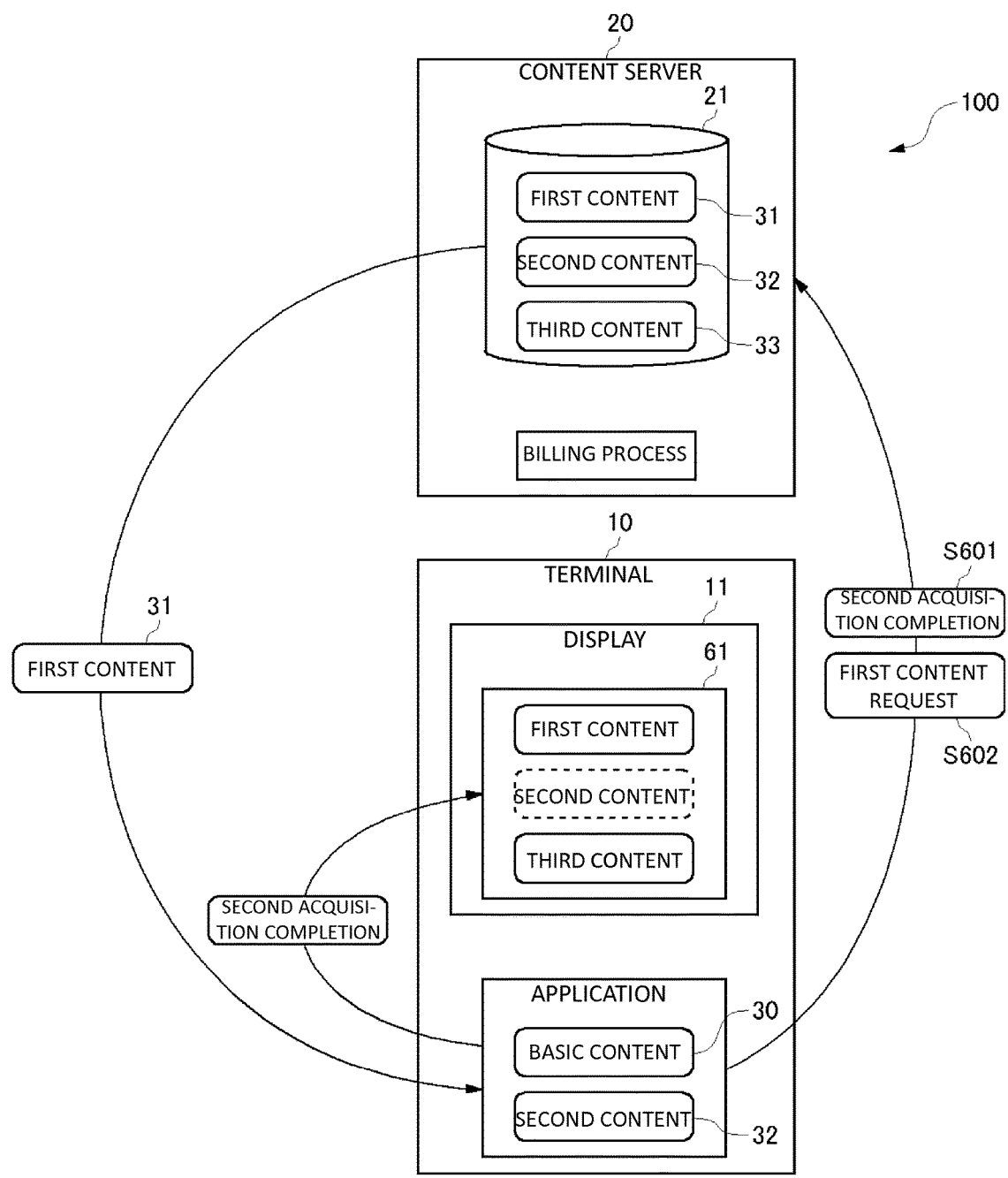
FIG. 6 shows an example non-limiting acquisition of additional content by a user who has purchased an application including second content.

FIG. 6 is a diagram for describing acquisition of additional content by the user who has purchased the application 42 including the second content 32 as illustrated in FIG. 3B. The acquisition of the additional content by the user who has purchased the application 42 including the second content 32 is similar to the acquisition of the additional content by the user who has purchased the application 41 including the first content 31 except that the first content 31 and the second content 32 are in reverse.

In other words, when the content addition function S4 is started, the terminal 10 checks the acquisition status of the additional content, and causes a second acquisition guide screen 62 to be displayed on the display 11. In the example of FIG. 6, since the second content 32 has been acquired, the second content 32 is displayed in the grayed-out manner and not selectable on the second acquisition guide screen 62.

When the user selects the first content 31 or the third content 33 and gives an designation using the input device, the terminal 10 transmits an acquisition request S602 for requesting the designated additional content to the content server 20. The terminal 10 transmits second acquisition completion information S601 indicating that the second content 32 has been acquired to the content server 20 as the acquisition status information indicating the acquisition status of the additional content.

The content server 20 transmits the additional content (the first content 31 in the example of FIG. 6) requested through the acquisition request S602 to the terminal 10, and at this time, the content server 20 understands the terminal 10 has already acquired the second content 32 based on the second acquisition completion information S601, and performs the billing process.

In the acquisition of the additional content by the user who has purchased the application 42 including the first content 31 as illustrated in FIG. 3A and the acquisition of the additional content by the user who has purchased the application 42 including the second content 32 as illustrated in FIG. 3B, in the terminal 10, a non-acquired one of the first content and the second content is designated, and in the content server 20, when the first acquisition completion information is received, the billing process is performed, the second content is provided to the terminal 10, and when the second acquisition completion information is received, the billing process is performed, and the first content is provided to the terminal 10.

Figure 7:
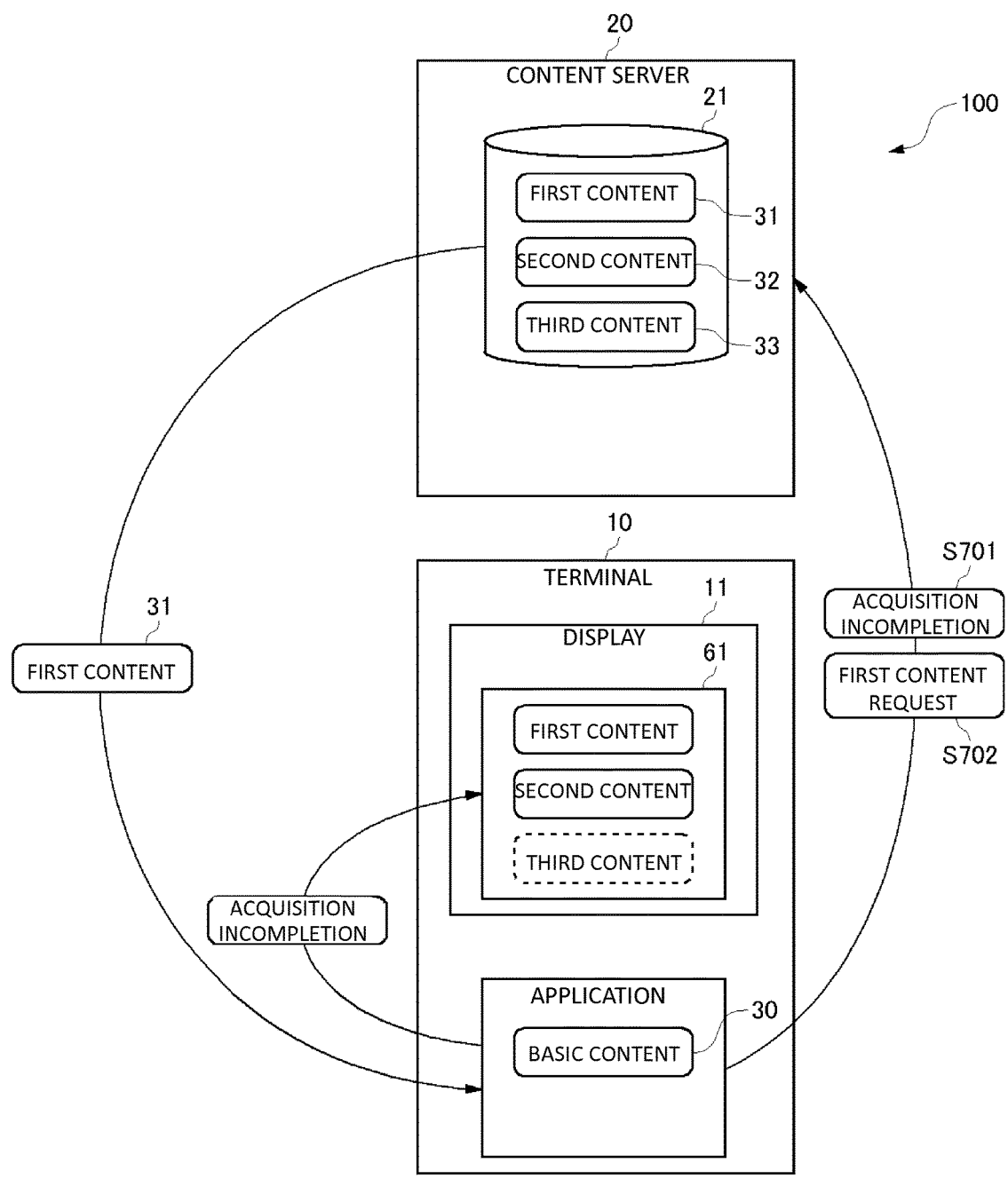
FIG. 7 shows an example non-limiting acquisition of additional content by a user who has purchased an application including no additional content.

FIG. 7 is a diagram for describing acquisition of additional content by the user who has purchased the application 43 without additional content as illustrated in FIG. 3C. The user who has purchased the application 43 without additional content can starts the content addition function S4 from the menu S2 (see FIG. 2) or start the content addition function S4 from the scenario selection screen 71 after the common scenario S5 ends. In other words, in a state in which there is no additional content, all scenarios are grayed-out on the scenario selection screen 71, and thus the user selects a scenario that is desired to proceed after downloading additional content and gives an instruction.

When the content addition function S4 is started, the terminal 10 causes a third acquisition guide screen 63 to be displayed on the display 11. The acquisition status of the additional content is reflected in the third acquisition guide screen 63. In the example of FIG. 7, neither the first content 31 nor the second content 32 has been acquired. Thus, acquisition of the first content 31 and the second content 32 is encouraged by setting the third acquisition guide screen 63 so that only the first content 31 and the second content 32 are selectable, and the third content 33 is grayed-out to be not selectable.

As described above, the third scenario S63 is prepared to be played after the first scenario S61 or the second scenario S62 is played, and thus the content server 20 provides the third content 33 to the user who has already acquired the first content 31 or the second content 32. Thus, as described above, the third acquisition guide screen 63 is set so that only the first content 31 and the second content 32 are selectable, and the third content 33 is grayed-out not to be selectable, and thus acquisition of the first content 31 and the second content 32 is encouraged.

On the third acquisition guide screen 63, instead of graying out the third content 33 not to be selectable, the third content 33 may not be presented, or after the third content 33 is set to be selectable, a message for encouraging playing the third scenario S63 after playing the first scenario S61 or the second scenario S62 may be displayed within the third acquisition guide screen 63, or the message may be presented in the pop-up manner when the third content 33 is selected. Further, even when the first content 31 or the second content 32 has not been acquired, the third acquisition guide screen 63 may be set so that the third content 33 is selectable, and the third content 33 can be acquired.

The user selects any one of the first content 31 and the second content 32 using the third acquisition guide screen 63 displayed on the display 11 and gives an instruction. The terminal 10 transmits an acquisition request S702 for requesting downloading of additional content that is one of the first content 31 and the second content 32 and selected by the user to the content server 20 using the transmitting device. The content server 20 transmits the additional content designated through the acquisition request S702 to the terminal 10. As a result, the user can acquire a desired one of the first content or the second content.

The terminal 10 transmits the acquisition status information to the content server 20 using the transmitting device. In the example of FIG. 7, since neither the first content 31 nor the second content 32 has been acquired, the terminal 10 transmits acquisition incompletion information S701 indicating that the first content 31 and the second content 32 have not been acquired to the content server 20 as the acquisition status information. The acquisition incompletion information S701 may be transmitted before the acquisition request S702, transmitted at the same time as the acquisition request S702, or transmitted after the acquisition request S702.

The user who has purchased the application 43 without additional content can acquire a desired one of the first content 31 and the second content 32 for free in a situation in which none of the first content 31 and the second content 32 has been acquired. It is because when the user who has purchased the application 43 without additional content has already paid the same amount of fee as a person who has purchased the application 41 or 42 with one additional content at the time of purchase as described above. Thus, when the acquisition incompletion information S701 is received as the acquisition status information, the content server 20 does not perform the billing process when any one of the first content 31 and the second content 32 is provided to the terminal 10.

Further, when the user who has purchased the application 43 without additional content as illustrated in FIG. 3C acquires the first content 31, it becomes a state illustrated in FIG. 3A. Further, when the user who has purchased the application 43 without additional content as illustrated in FIG. 3C acquires the second content 32, it becomes a state illustrated in FIG. 3B. Thus, after the user who has purchased the application 43 without additional content selects and acquires any one of the first content 31 and the second content 32, it is possible to acquire additional content (including the third content 33) that has not been acquired as illustrated in FIGS. 5 and 6. Further, the billing process is performed on the additional content acquired as described above.

By acquiring the additional content as described above, the user can play another scenario after playing the first scenario S61, the second scenario S62, or the third scenario S63 ends.

The functions of the terminal 10 may be processed by a single processor or shared and processed by a plurality of processors. The functions of the content server 20 may also be processed by a single processor or shared and processed by a plurality of processors.

In the above embodiment, when the common scenario S5 ends, the user is caused to select the first to third scenarios S61 to S63, and when the user selects a scenario in which corresponding additional content has not been acquired, the content addition function S4 is started. Instead, when the user selects a scenario in which additional content has not been acquired, some scenarios (corresponding to one chapter, for example) may be set to be played for free without adding additional content, and after playing of some scenarios ends, an inquiry as to whether or not the scenario is continued may be given to the user, and when the user desires to continue, the content addition function S4 may be started, and the scenario (additional content) may be downloaded after the billing process may be performed. Further, when the user does not desire to continue the scenario, the scenario selection screen 71 may be displayed again so that the user selects a scenario again.

Further, when another scenario is played after any one of the first scenario S61, the second scenario S62, and the third scenario S63 is played through the common scenario S5, the common scenario S5 may be skipped. In other words, once the common scenario S5 ends, the user may start any new scenario from the scenario selection screen 71 without the need for playing the common scenario S5 again.

When another scenario is played after any one scenario is played, various designs are considered for transfer of experiences in the former scenario. In a first design, when the common scenario S5 ends, experiences in the common scenario S5 is saved in the terminal 10, and when another scenario is played after any one of the first scenario S61, the second scenario S62, and the third scenario S63 is played, the experiences in the common scenario S5 are transferred. In other words, another scenario can be started in the same state as when a scenario is selected on the scenario selection screen 71 for the first time.

In a second design, after any one of the first scenario S61, the second scenario S62, and the third scenario S63 is played, experiences in the scenario are saved, and then when another scenario is played, the saved experiences in the former scenario are transferred. In this case, when the second scenario S62 is played after the first scenario S61 is played, development of a story is expected to differ from when the second scenario S62 is played from the beginning, and the pleasure of playing a different scenario according to additional content increases.

In a third design, when another scenario is played after any one scenario is played, another scenario can be played without transferring playing substance of the former scenario including the common scenario S5. Further, the first to third designs may be set to be selectable as a transfer mode.

In the above embodiment, the third content 33 can be acquired only after the first content 31 or the second content 32 is acquired based on substance of the third scenario S63, but after the first content 31 or the second content 32 is acquired and then the third content 33 is acquired, the third scenario S63 can be played even in a situation in which any of the first scenario S61 and the second scenario S62 has not been played. Instead, the third scenario S63 may be set to be played only after playing the first scenario S61 or the second scenario S62 ends, or the third content 33 may be set to be acquired only after playing the first scenario S61 or the second scenario S62 ends.

In the above embodiment, the first acquisition completion information and the second acquisition completion information are information indicating that the first content and the second content have been acquired, but information specifying non-acquired additional content may be used as the acquisition status information. In other words, the first acquisition completion information may be information indicating that the second content has not been acquired or information indicating that the second content and the third content have not been acquired, and the second acquisition completion information may be information indicating that the first content has not been acquired or information indicating that the first content and the third content have not been acquired.

In the above embodiment, the acquisition guide screen in which the acquisition status of the additional content has been reflected is read out to the terminal 10 or generated and displayed on the display, but instead, the content server 20 may transmit the acquisition guide screen to the terminal 10, and the terminal 10 may receive the acquisition guide screen and cause the acquisition guide screen to be displayed on the display 11. In this case, the acquisition guide screen according to the acquisition status of the additional content may be prepared in advance and stored in the auxiliary memory device 21 of the content server 20, the corresponding acquisition guide screen may be read and transmitted to the terminal 10 according to the acquisition status information received by the terminal 10, or the acquisition guide screen may be generated and transmitted to the terminal 10 according to the acquisition status information received by the terminal 10 each time. In this case, at least some components for an acquisition guide are arranged in the content server 20.

In the above embodiment, the first content 31 and the second content 32 are set as specific additional content, and it is difficult to acquire the third content serving as other additional content unless any one of the first content 31 and the second content 32 is acquired. Further, when an application without additional content is purchased through the sales style of FIG. 3C, any one of the first content 31 and the second content 32 serving as the specific additional content is selected and acquired from the content server 20 after purchased, and a fee for one of the first content 31 and the second content 32 which has first been acquired is included in a fee of the application without additional content (that is, prepaid), and when it is actually acquired, the billing process is not performed.

The number of types of specific additional content is not limited to two (the first content 31 and the second content 32) and may be three or more. For example, the number of types of specific additional content may be four, and the number of types of other additional content may be three, and, for example, other additional content may be set not to be acquired when two or more types of specific additional content are not acquired.

The number of types of specific additional content (that is, additional content that can be acquired without performing the billing process after an application is purchased) that is prepaid may be two or more as well. For example, the number of types of specific additional content may be four, and the number of types of additional content that is prepaid may be two. In this case, arbitrary two types of additional content selected from four types of specific additional content can be acquired without performing the billing process until two types of specific additional content are acquired after an application is purchased.

In the above embodiment, a scenario corresponding to non-acquired additional content is grayed-out on the scenario selection screen not to be selectable, but the technology is not limited to this example, and for example, a display form of a scenario corresponding to non-acquired additional content may be a display form that is distinguished from a scenario corresponding to an acquired additional content. Further, non-selectable additional content is grayed-out even on the first to third acquisition guide screens 61 to 63, but the technology is not limited to this example, and for example, a display form of non-selectable additional content may differ from that of selectable additional content.

In the above embodiment, the first acquisition completion information and the second acquisition completion information are information indicating that the first content and the second content have been acquired, respectively. However, the fact that the application 41 has been acquired means that the first content has been acquired, and the fact that the application 42 has been acquired means that the second content 32 has been acquired, and thus the first acquisition completion information and the second acquisition completion information may be information indicating that the application 41 and the application 42 have been acquired, respectively. When the content server 20 receives the first acquisition completion information indicating that the first application has been acquired or receives the second acquisition completion information indicating that the second application has been acquired, the billing process is performed when the additional content requested through the acquisition request is provided to the terminal 10.

What is claimed is:

1. A content provision system, comprising:
a content server; and
a terminal,
the system providing a plurality of pieces of additional content used in an application from the content server to the terminal, wherein
the terminal includes at least one processor,
the terminal being configured to receive designation of the additional content, transmit an acquisition request for requesting acquisition of the designated additional content to the content server,
the terminal being further configured to transmit acquisition completion information to the content server when a predetermined number or more of pieces of additional content are acquired, and
the terminal being further configured to transmit acquisition incompletion information to the content server when the number of acquired additional content is less than the predetermined number, the acquisition incompletion information is acquisition status information indicating a status of the additional content acquired from the content server,
the content server includes at least one processor,
the content server being configured to receive the acquisition request and the acquisition completion information or the acquisition incompletion information,
the content server being further configured to perform a billing process and provide the additional content requested through the acquisition request to the terminal when the content server determines that the acquisition completion information is received from the terminal, and provide the additional content requested through the acquisition request to the terminal without performing the billing process when the content server determines that the acquisition incompletion information, including the acquisition status information, is received from the terminal.

2. The content provision system according to claim 1, wherein the application undergoes the billing process and is downloaded to the terminal.

3. The content provision system according to claim 2, wherein the terminal designates the additional content after the billing process for the application, transmits the acquisition request according to the designation to the content server, and transmits the acquisition incompletion information to the content server.

4. The content provision system according to claim 1, further comprising,
at least one processor, the at least one processor being configured to encourage the terminal to acquire the additional content that has not been acquired by the terminal among the additional content.

5. The content provision system according to claim 4, wherein the plurality of pieces of additional content include a plurality of pieces of specific additional content, and
the at least one processor is further configured to limit acquisition of additional content other than the specific additional content when the number of acquired specific additional content is less than the predetermined number.

6. The content provision system according to claim 1, wherein the application is an application including basic content, and
the terminal is accessible to the content server in order to acquire the additional content when a predetermined condition is satisfied in execution of the basic content.

7. The content provision system according to claim 1, wherein the terminal is accessible to the content server in order to acquire the additional content when the application is not executed.

8. The content provision system according to claim 1, wherein the application is an application of a game, and the plurality of pieces of additional content differ in a scenario, a map, a level of difficulty, and/or characters to be a colleague in the game.

9. The content provision system according to claim 1, wherein the terminal is configured to play one or more video games and the additional content corresponds to content for the one or more video games.

10. The content provision system according to claim 1, wherein the additional content includes, at least, first content and second content, and the terminal transmits acquisition incompletion information when the first content and second content have not been acquired.

11. The content provision system according to claim 1, wherein the acquisition completion information and the acquisition incompletion information are transmitted with the acquisition request for requesting acquisition of the designated additional content.

12. A content provision system, comprising:
a content server; and
a terminal,
the system providing additional content including first and second content used in an application from the content server to the terminal, wherein
the terminal includes at least one processor,
the terminal being configured to transmit first acquisition completion information, as status information, to the content server when a first application including basic content and the first content is acquired and transmit second acquisition completion information, as the status information, to the content server when a second application including the basic content and the second content is acquired,
the terminal being further configured to designate one of the first content and the second content that has not been acquired, and
the terminal being further configured to transmit an acquisition request for requesting the designated content,
the content server includes at least one processor,
the content server being configured to receive the acquisition request and either of the first acquisition completion information and the second acquisition completion information,
the content server being further configured to perform a billing process and provide the second content to the terminal when the content server determines that the first acquisition completion information, as the status information, is received from the terminal, and perform the billing process and provide the first content to the terminal when the content server determines that the second acquisition completion information, as the status information, is received through a receiver from the terminal.

13. The content provision system according to claim 12, wherein the content provision system includes at least one processor, the at least one processor being configured to encourage acquisition of the second content when the first application has been acquired and encourage acquisition of the first content when the second application has been acquired.

14. The content provision system according to claim 12, wherein the terminal is accessible to the content server in order to acquire the non-acquired additional content when a predetermined condition is satisfied in execution of the basic content.

15. The content provision system according to claim 12, wherein the terminal is accessible to the content server in order to acquire the non-acquired additional content when the application is not executed.

16. The content provision system according to claim 12, wherein the application is an application of a game, and the plurality of pieces of additional content differ in a scenario, a map, a level of difficulty, and/or characters to be a colleague in the game.

17. A content provision method of providing a plurality of pieces of additional content used in an application from a content server to a terminal, comprising:
    designating, by the terminal, additional content to be acquired;
    transmitting, by the terminal, an acquisition request according to the designation to the content server;
    transmitting, by the terminal, acquisition completion information to the content server when a predetermined number or more of pieces of the additional content are acquired;
    transmitting, by the terminal, acquisition incompletion information to the content server when the number of acquired additional content is less than the predetermined number, the acquisition incompletion information is acquisition status information indicating a status of the additional content acquired from the content server;
    receiving, by the content server, the acquisition request;
    receiving, by the content server, the acquisition completion information or the acquisition incompletion information;
    performing, by the content server, a billing process and providing the additional content requested through the acquisition request to the terminal when the content server determines that the acquisition completion information is received from the terminal; and
    providing, by the content server, the additional content requested through the acquisition request to the terminal without performing the billing process when the content server determines that the acquisition incompletion information, including the acquisition status information, is received from the terminal.

18. A content provision method of providing additional content including first and second content used in an application from a content server to a terminal, comprising:
    transmitting, by the terminal, first acquisition completion information, as status information, to the content server when a first application including basic content and the first content are acquired;
    transmitting, by the terminal, second acquisition completion information, as the status information, to the content server when a second application including the basic content and the second content is acquired;
    designating, by the terminal, one of the first content and the second content that has not been acquired;
    transmitting, by the terminal, an acquisition request for requesting the acquisition of the designated content;
    receiving, the content server, the status information;
    receiving, by the content server, the acquisition request;
    performing, by the content server, a billing process and providing the second content to the terminal when the content server determines that the first acquisition completion information, as the status information, is received from the terminal; and
    performing, by the content server, the billing process and providing the first content to the terminal when the content server determines that the second acquisition completion information, as the status information, is received in the receiving of the acquisition status information from the terminal.

19. A content server that provides a plurality of pieces of additional content used in an application to a terminal, comprising:
    at least one processor,
    the content server being configured to receive acquisition completion information indicating that a predetermined number or more of the additional content is acquired or acquisition incompletion information indicating that the number of acquired additional content is less than the predetermined number and receive an acquisition request for requesting acquisition of the designated additional content, the acquisition incompletion information is acquisition status information indicating a status of the additional content acquired from the content server,
    the content server being further configured to perform a billing process and provide the additional content requested through the acquisition request to the terminal when the content server determines that the acquisition completion information is received from the terminal, and provide the additional content requested through the acquisition request to the terminal without performing the billing process when the content server determines that the acquisition incompletion information, including the acquisition status information, is received from the terminal.

20. A content server that provides a plurality of pieces of additional content including first and second content used in an application to a terminal, comprising:
    at least one processor,
    the content server being configured to receive first acquisition completion information, as status information, when a first application including basic content and the first content transmitted from the terminal is acquired or second acquisition completion information, as the status information, when a second application including the basic content and the second content is acquired, and receive an acquisition request for requesting acquisition of the designated additional content,
    the content server being further configured to perform a billing process and provide the second content to the terminal when the content server determines that the first acquisition completion information, as the status information, is received from the terminal, and perform the billing process and provide the first content to the terminal when the content server determines that the second acquisition completion information, as the status information, is received through a receiver from the terminal.

21. A non-transitory computer-readable storage medium that stores a content provision program, the content provision program being executed by a computer and causing the computer to:

function as a content server that provides a plurality of pieces of additional content used in an application to a terminal;
receive acquisition completion information indicating that a predetermined number or more of the additional content is acquired or acquisition incompletion information indicating that the number of acquired additional content is less than the predetermined number and receive an acquisition request for requesting acquisition of the designated additional content, the acquisition incompletion information is acquisition status information indicating a status of the additional content acquired from the content server; and
perform a billing process and provide the additional content requested through the acquisition request to the terminal when the content server determines that the acquisition completion information is received from the terminal, and provide the additional content requested through the acquisition request to the terminal without performing the billing process when the content server determines that the acquisition incompletion information, including the acquisition status information, is received by a receiver from the terminal.

22. A non-transitory computer-readable storage medium that stores a content provision program, the content provision program being executed by a computer and causing the computer to:
function as a content server that provides a plurality of pieces of additional content used in an application to a terminal;
receive first acquisition completion information, as status information, when a first application including basic content and the first content transmitted from the terminal is acquired or second acquisition completion information, as the status information, when a second application including the basic content and the second content is acquired, receive an acquisition request for requesting acquisition of the designated additional content; and
perform a billing process and provide the second content to the terminal when the content server determines that the first acquisition completion information, as the status information, is received from the terminal, and perform the billing process and provide the first content to the terminal when the content server determines that the second acquisition completion information, as the status information, is received from the terminal.

* * * * *